UNITED STATES PATENT OFFICE.

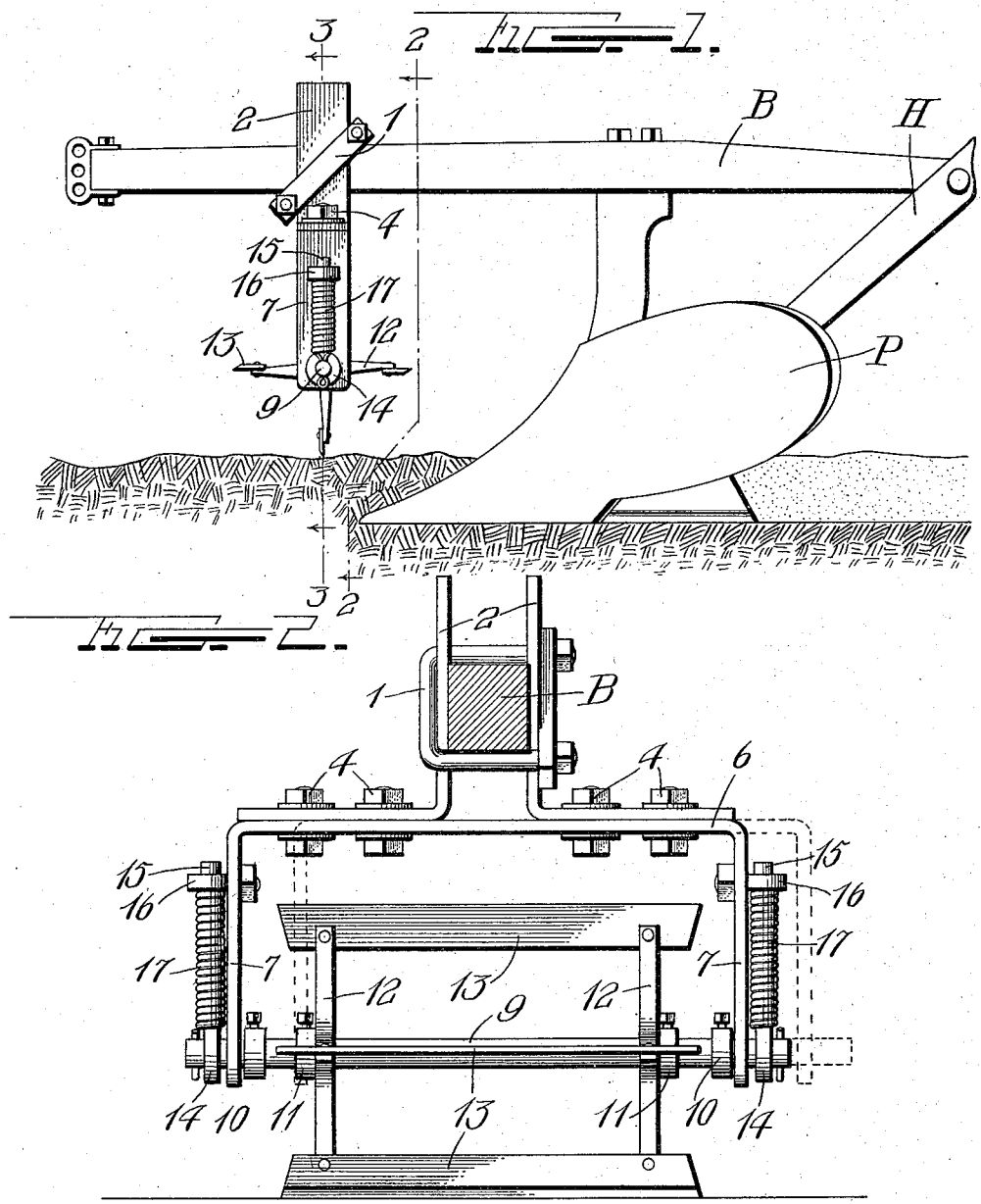

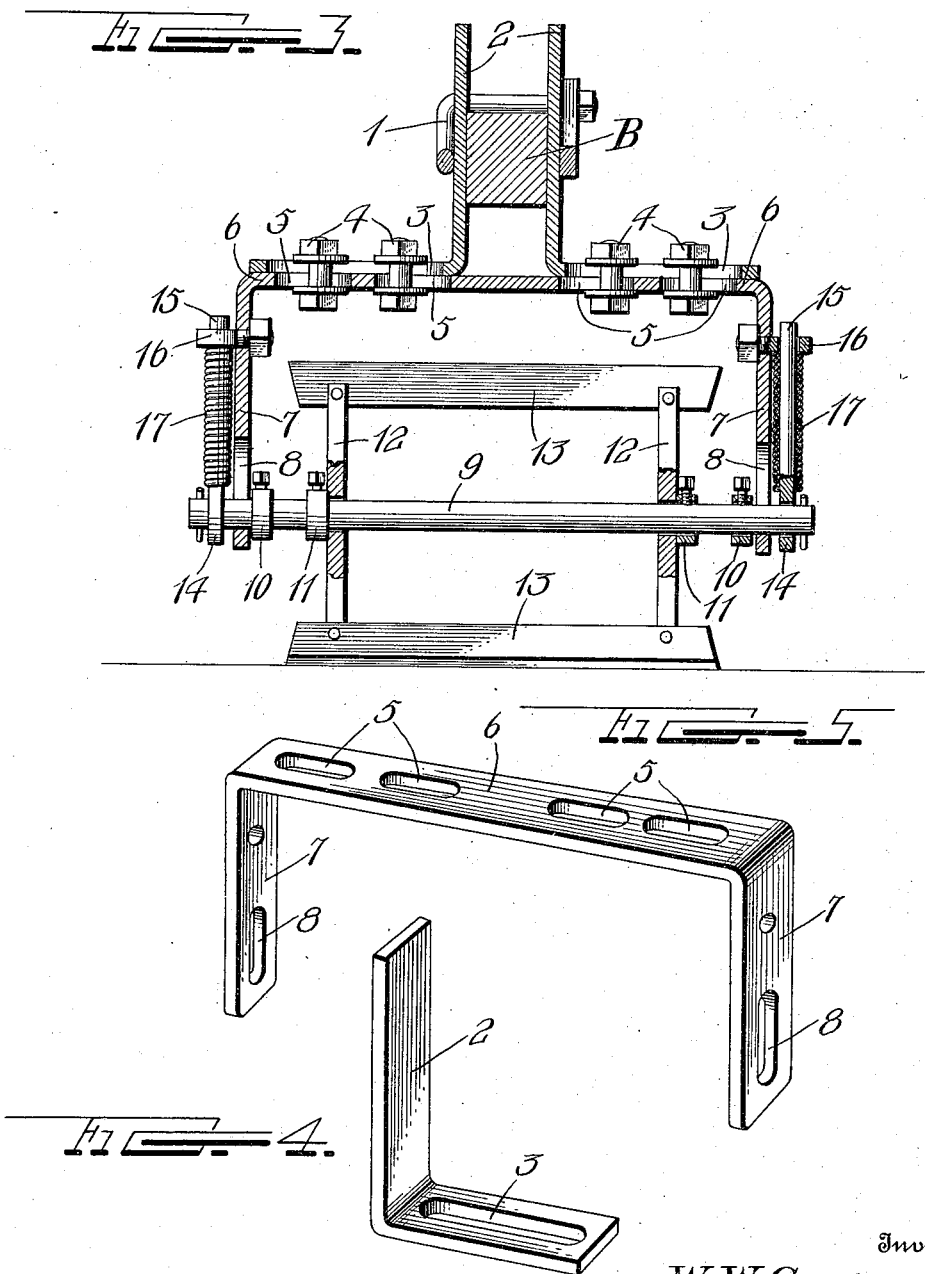

WALLACE W. GRAY AND FRANK P. WITZSCHE, OF LOTT, TEXAS.

STALK AND STRAW CHOPPER.

1,156,992.  Specification of Letters Patent.  Patented Oct. 19, 1915.

Application filed November 9, 1914. Serial No. 871,161.

*To all whom it may concern:*

Be it known that we, WALLACE W. GRAY and FRANK P. WITZSCHE, citizens of the United States, residing at Lott, in the county of Falls and State of Texas, have invented certain new and useful Improvements in Stalk and Straw Choppers; and we do declare the following to be a full, clear, and exact description of the invention, such as will enable others skilled in the art to which it appertains to make and use the same.

Our invention relates broadly to improvements in agricultural implements and specifically to stalk, straw and weed choppers for attachment to plows.

The main object of the invention is to provide an extremely simple device having a number of advantageous features, and to construct the same in such a manner as to render it readily applicable to any plow beam.

In carrying out the above end, a further object becomes to provide novel means for mounting the cutter proper in such a manner as to allow the same to have a slight amount of vertical movement against a pair of springs.

Yet another object is to provide an adjustable attaching bracket for connecting the device to a plow and to connect a cutter carrying frame to said bracket, in such a manner as to allow said frame to be adjusted laterally, thereby adjusting the cutter toward one side of the plow or the other.

With the above and minor objects in view, the invention resides in certain novel features of construction and combination herein described and claimed and shown in the drawings wherein;

Figure 1 is a side elevation of a device constructed in accordance with my invention, showing its application to the beam of a plow; Fig. 2 is a transverse vertical section as seen on the line 2—2 of Fig. 1, showing one of the adjusted positions of the cutter carrying frame, in dotted lines; Fig. 3 is a similar view taken on the line 3—3 of Fig. 1; Fig. 4 is a perspective view of one of the attaching brackets; and Fig. 5 is a similar view of the cutter carrying frame.

In the accompanying drawings, an ordinary plow P is illustrated having the usual beam B and handles H. Connected to the beam B by a U-shaped clip 1, is a pair of L-shaped attaching brackets 2 whose horizontal arms (see more particularly Fig. 3) are provided with slots 3 through which pairs of clamping bolts 4 rise, said bolts likewise passing through slots 5 formed in a horizontal transverse bar 6 which constitutes a portion of an inverted U-shaped cutter carrying frame, the opposite ends of said bars 6 being bent downwardly to provide a pair of parallel arms 7, whose lower ends are provided with vertical slots 8.

Mounted for vertical movement within the slots 8 is a horizontal transverse shaft 9 which is provided with stops 10 contacting with the inner sides of the arms 7, and with other stops 11 spaced inwardly from those designated at 10, said stops 11 holding a pair of four-armed spiders 12 against lateral shifting on the shaft. The two spiders 12 are connected by cutting blades 13 as most clearly seen in Figs. 2 and 3, and are revolubly mounted upon the shaft as most clearly disclosed in the last named figure.

By reference to the various figures of the drawings, it will be seen that the free ends of the shaft 9 are passed through eyes 14 on the lower ends of upright rods 15, said rods having their upper ends slidably mounted in guides 16 which project laterally from the upper end portions of the arms 7, said guides being here shown in the form of eye bolts. Interposed between the guides 16 and the eyes 14 and encircling the rods 15 is a pair of upright coiled springs 17, which exert their tension to normally force the cutting blades into contact with the litter on the ground, and which allow said cutters to move upwardly in case a stone or other obstacle should be struck. Cotter pins 18 are preferably passed through the free ends of the shaft 9 for the purpose of preventing removal of the eyes 14.

A device constructed in accordance with the above description and the accompanying illustration, possesses numerous advantages, the most prominent being the fact that the two brackets 2, may be spaced suitable distances to render the device applicable to any size plow beam, without altering the latter in any manner whatsoever. A further advantage is derived by the adjustable connection between the brackets and the U-shaped frame, since said frame may be adjusted laterally with respect to the brackets, as seen in dotted lines in Fig. 2, thereby correctly centering the cutter with respect to the plow P, thus insuring cutting of all stalks, straw, weeds or other litter before the soil is turned by the plow.

From the foregoing description taken in connection with the accompanying drawings, it will be seen that an extremely simple device has been provided for carrying out the objects of the invention, yet that the efficiency thereof is not impaired by such simplicity.

We claim:

1. A device of the character described comprising an attaching bracket designed for connection to a plow beam, an inverted U-shaped frame secured to said bracket, said frame having upright slots in its parallel arms, a shaft projecting through said slots and a rotary cutter mounted on the shaft between the arms, guides projecting laterally from said arms, upright rods slidable in said guides and having eyes surrounding the shaft, and coiled springs encircling said rods and interposed between the guides and the eyes.

2. A device of the character described comprising a pair of spaced L-shaped brackets movable one toward the other and designed for connection to a plow beam, an inverted U-shaped frame beneath the horizontal arms on said brackets and adjustably secured thereto, the parallel upright arms in said frame having upright slots, a transverse shaft mounted for vertical movement in said slots, a rotary cutter mounted on said shaft between the arms, guides projecting laterally from said arms, upright rods slidable in said guides and having eyes encircling the shaft, and coiled springs encircling said rods and interposed between the guides and the eyes.

In testimony whereof we have hereunto set our hands in presence of two subscribing witnesses.

WALLACE W. GRAY.
FRANK P. WITZSCHE.

Witnesses:
F. J. GAUSEMEIER,
B. P. HOELSCHER.

Copies of this patent may be obtained for five cents each, by addressing the "Commissioner of Patents, Washington, D. C."